A. E. HODDER.
AUTOMATIC WATER ELEVATOR.
APPLICATION FILED JAN. 6, 1908.
968,661.
Patented Aug. 30, 1910.
2 SHEETS—SHEET 1.
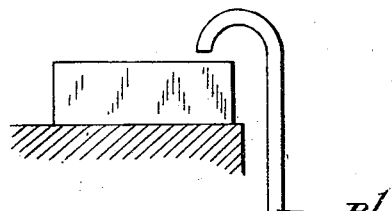
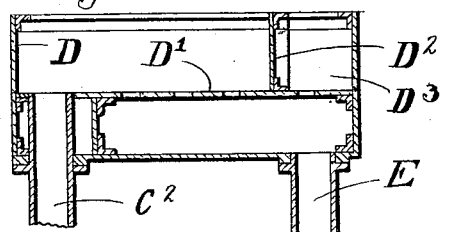
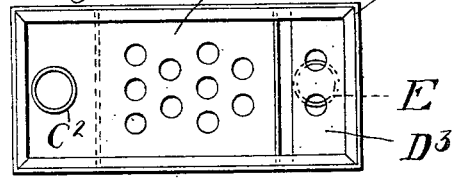
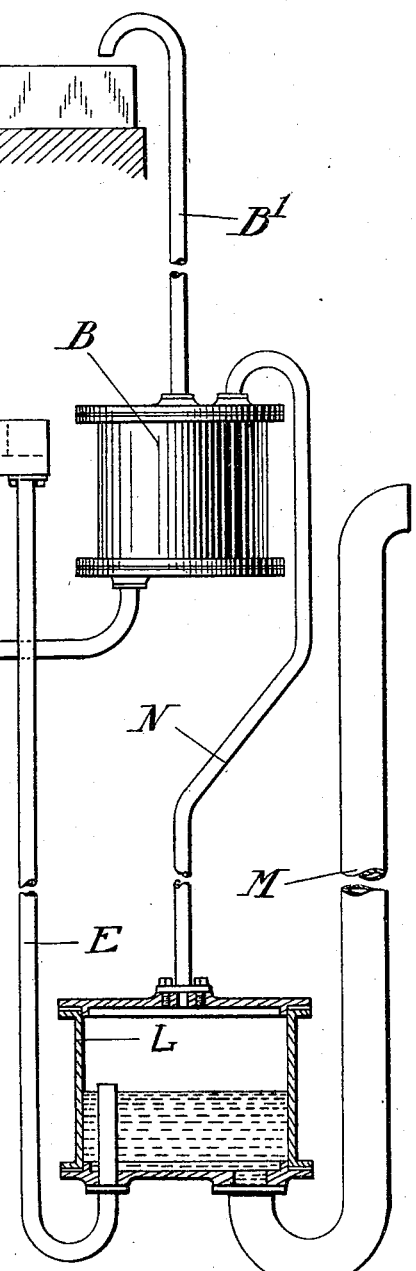

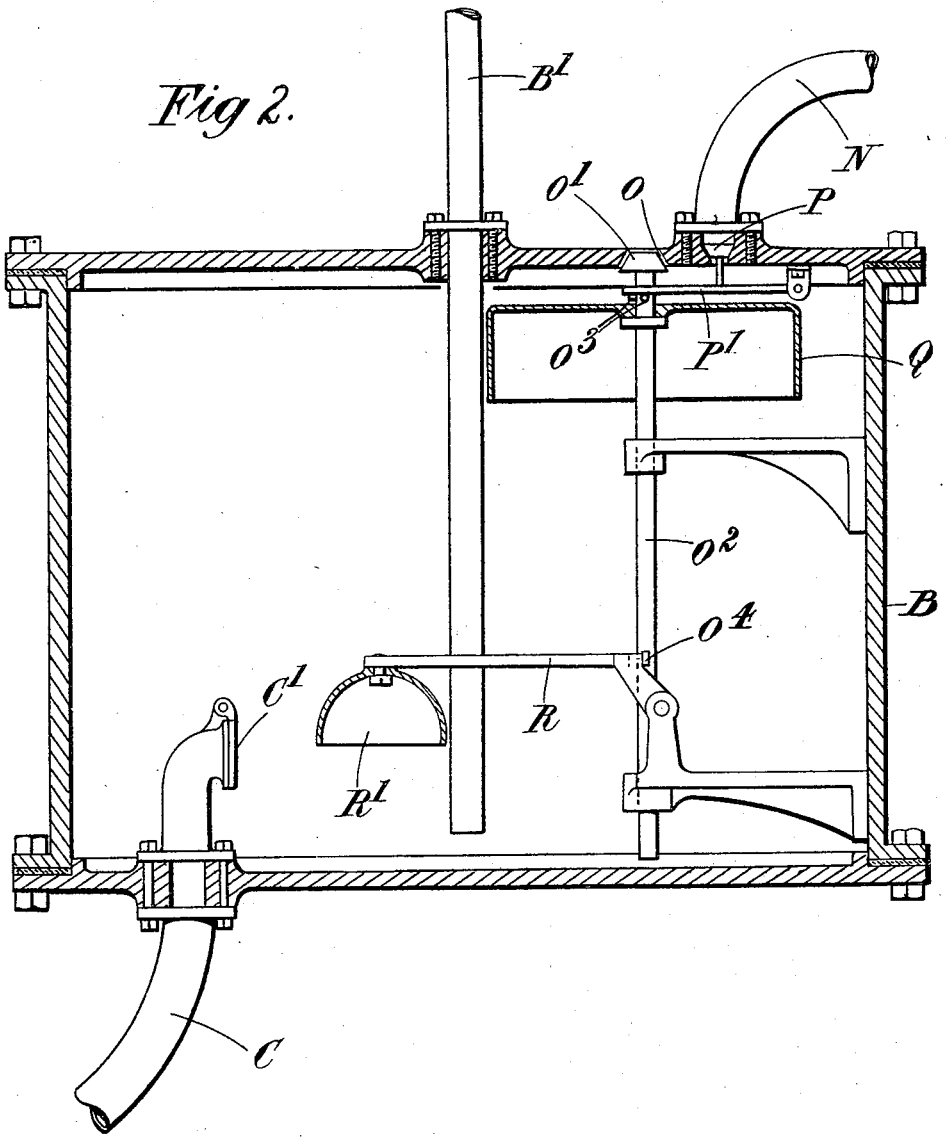

UNITED STATES PATENT OFFICE.

ALBERT EDWARD HODDER, OF LONDON, ENGLAND.

AUTOMATIC WATER-ELEVATOR.

968,661.   Specification of Letters Patent.   Patented Aug. 30, 1910.

Application filed January 6, 1908. Serial No. 409,558.

*To all whom it may concern:*

Be it known that I, ALBERT EDWARD HODDER, a subject of the King of England, and residing in London, England, have invented certain new and useful Improvements in Automatic Water-Elevators, of which the following is a specification.

According to this invention which is specially applicable to cases where the available head of water is small, the apparatus comprises the combination with an upper closed tank having a valve-controlled water inlet leading from the source and an outlet for water under pressure, of a lower pressure tank having an outlet for compressed air at the top leading to the top of the closed tank, an aerator at the level of the source supplied with water therefrom, a downtake pipe arranged to supply air-charged water to the pressure tank and an up-take pipe to lead water from the pressure tank up to the level of discharge.

In the accompanying drawings which illustrate two forms of water elevator embodying this invention—Figure 1 is a diagrammatic elevation of one form of apparatus embodying this invention; Fig. 2 is a vertical section of the upper tank in that arrangement; Fig. 3 is a vertical section of the aerating tank; and Fig. 4 is a plan of the same.

Like letters indicate like parts throughout the drawings.

Referring to Figs. 1 to 4 A is a source of water which may be any body of water so situated that it can be discharged to a lower level. The closed vessel or container B shown here as a cylinder is connected with the source A by a conduit C having a non-return valve $C'$ at the outlet. The discharge pipe $B'$ for water under pressure extends from a point near the bottom of the container B upward to a height above the level of the source. An aerating tank D is placed at or about the level of the source, and is provided with a water outlet pipe E at the bottom.

A perforated diaphragm $D'$ extends across the tank D and the aggregate area of the holes in the diaphragm is greater than the area of the outlet E. The water inlet pipe $C^2$ extends from the pipe C to a point above the diaphragm $D'$ and is connected to the pipe C. The top of the pipe $C^2$ is about the level of the top of the chamber B so that the chamber B becomes filled with water before water is supplied to the aerating tank D. Above the diaphragm $D'$ and between the inlet $C^2$ and outlet E is a division plate $D^2$ which shuts off a portion $D^3$ of the aerating tank above the outlet E so that water cannot flow direct from the inlet $C^2$ over the holes thus shut off. This arrangement serves a double purpose. In the first place it prevents an air-lock taking place when the water first enters the tank and it afterward serves to admit air freely which is drawn down into the outlet pipe E as the water falls therein. If the water passing down the outlet pipe E becomes supercharged with air, any air given off thereby passes through the holes in the diaphragm into the small open chamber $D^3$, but if the water is capable of carrying more air than it obtains in passing through the aerating tank, it draws more air through the holes in the bottom of the chamber $D^3$. The water inlet pipe $C^2$ extends from the source A into the aerating tank D. From the aerating tank D one or more downtake conduits E are led to a lower reservoir L. The reservoir L may be at any required distance from the container B; for example there may be a difference of level of one hundred feet between them. Each downtake pipe E conveying water and air descends to the reservoir L and its delivery end within the reservoir is above the bottom thereof. Preferably the pipe E is taken down below the bottom of the reservoir L and brought up again to enter it. The action of this aerating apparatus is as follows:—Water entering by the pipe $C^2$ overspreads the diaphragm $D'$ as far as the partition $D^2$ and falls through the holes in the diaphragm in a shower, and on reaching the bottom of the aerating tank it flows down the pipe E carrying a large quantity of air with it. If the partition $D^2$ were omitted it might occur that a layer of water was formed over the whole of the diaphragm $D^1$ and every one of the comparatively small holes therein might be covered with water, thus nothing would pass down the pipe E but water.

From the bottom of the reservoir L an uptake water pipe M leads upward and terminates at the tail race or point at which the water can be led away. For example it may terminate at a level a few feet lower than that of the source A.

From the top of the reservoir L a pipe N for the delivery of compressed air leads to the top of the upper reservoir B. At the top of the container B is an air vent O controlled by a valve O'. The container B is also provided with a discharge pipe B' starting from near the bottom and mounting to the required height. Upon the pipe N is a valve P which may be at the point where the pipe enters the container B. This valve P, which may be the admission valve for the compressed air from the reservoir L to the container B is operatively connected with the valve O' already referred to and the connection between these valves is such that when the vent O is closed the admission valve P is opened and vice versa. For example as shown the spindle $O^2$ of the valve O' may have pins $O^3$ adapted to engage a pivoted lever P' below the valve P. On the spindle $O^2$ of the valve O' is a float Q near the top of the container B and near the bottom of the spindle $O^2$ are projections $O^4$ arranged to engage a pivoted catch R controlled by a bell float R' near the bottom of the container B. Thus when the container B is filled with water the float Q rises and closes the vent O. The bell float R' also rises and brings the catch R underneath the projections $O^4$. When the water is being driven out of the container B the catch R prevents the spindle $O^2$ from falling and it is not therefore until the water has been discharged from the container B and the bell-float R' has fallen that the float Q and the valve O' are suddenly allowed to fall thereby opening the vent O and closing the valve P.

The operation of the apparatus is as follows:—Assuming that the container B is empty, the valve P closed and the vent O opened, water flows into the container B from the source A through the non-return valve C' until the container B is filled, when the vent O is closed and the valve P is opened. Water from the source A flows continuously through the aerating tank D entering by means of the pipe $C^2$. The water overspreads the diaphragm D' as far as the partition $D^2$ and falls through the holes in the diaphragm in a shower, and on reaching the bottom of the aerating tank it flows down the pipe E carrying a large quantity of air with it. If the partition $D^2$ were omitted it might occur that a layer of water was formed over the whole of the diaphragm D' and everyone of the comparatively small holes therein might be covered with water, thus nothing would pass down the pipe E but water. With the present construction however the water becomes continuously charged with air the latter being carried into the lower pressure tank L thereby considerably adding to the pressure in the lower tank by the separation of the air from the water.

The air in the lower pressure tank L is imprisoned in the upper part thereof and in the pipe N while the valve P is closed. When this condition of affairs is established the passage of water through the reservoir L in by way of the downtake E and out again by the uptake M will be continuous and air will be continuously given off from the incoming water. The uptake pipe is greater in diameter than the downtake pipe E and the uptake pipe M does not conduct away any air bubbles from the tank L. When the valve P is open, the air admitted by the pipe N to the upper reservoir B expels water therefrom by the discharge pipe B' and this discharge continues until the water has been brought low enough to allow the bell-float R' and consequently the float Q to fall, thus opening the vent O and closing the valve P. The water inlet valve C now opens so that the reservoir again fills and as it becomes full the float Q connected with the valve O' again closes this valve and consequently opens the air admission valve P again. It will be seen that the head of water in this case, namely the difference of level between the source A and the top of the uptake pipe M is comparatively small. Nevertheless the pressure of the air in the chamber L is dependent upon the height of the discharge above the lower reservoir L and this pressure may therefore be considerable and consequently the height to which water can be driven upward in the pipe B' is also considerable.

What I claim as my invention and desire to secure by Letters Patent is:—

1. In a water elevator the combination of a source of water, a discharge conduit at a short distance below the level of said source, an upper closed tank, a valve-controlled water inlet in said tank connected with the source of water, an outlet from said upper tank for water under pressure, a lower pressure tank below the level of the discharge conduit, an outlet for compressed air at the top of said lower tank leading into the top of the upper closed tank, an aerator at the level of the source, a conduit leading from the source to the aerator, a down take pipe from the aerator to the lower pressure tank arranged to supply air-charged water to the pressure tank, and an uptake pipe to lead water from the lower pressure tank up to the discharge conduit.

2. In a water elevator the combination of a source of water, a discharge conduit at a short distance below the level of said source, an upper closed tank, a valve-controlled water inlet in said tank connected with the source of water, an outlet from said upper tank for water under pressure, a lower pressure tank below the level of the discharge conduit, an outlet for compressed air at the top of said lower tank leading to the top of the upper closed tank, an aerator at the level of the source comprising an open tank having a perforated diaphragm between the water inlet and water outlet and a division plate above said diaphragm and near the water outlet, a conduit leading from the source to the aerator, a downtake pipe from the aerator to the lower pressure tank arranged to supply air-charged water to the pressure tank, and an uptake pipe to lead water from the lower pressure tank up to the discharge conduit.

3. In a water elevator the combination of a source of water, a discharge conduit at a short distance below the level of said source, an upper closed tank, a valve-controlled water inlet in said tank connected with the source of water, an outlet from said upper tank for water under pressure, an air inlet valve in said upper vessel, an air vent in said upper vessel and means for opening the valve and closing the vent when the vessel is filled with water and for suddenly opening the vent and closing the valve when the vessel is empty of water, a lower pressure tank below the level of the discharge conduit, an outlet for compressed air at the top of said lower tank leading to the top of the upper closed tank, an aerator at the level of the source, a conduit leading from the source to the aerator, a down-take pipe from the aerator to the lower pressure tank arranged to supply air-charged water to the pressure tank, and an uptake pipe to lead water from the lower pressure tank up to the discharge conduit.

4. In a water elevator the combination of a source of water, a discharge conduit at a short distance below the level of said source, an upper closed tank, a valve controlled water inlet in said tank connected with the source of water, an outlet from said upper tank for water under pressure, an air inlet valve in said upper vessel, an air vent in said upper vessel bell floats and projections for opening the valve and closing the vent when the reservoir is filled with water, and for suddenly opening the vent and closing the valve when the reservoir is empty of water, a lower pressure tank below the level of the discharge conduit, an outlet for compressed air at the top of said lower tank leading to the top of the upper closed tank, an aerator at the level of the source, a conduit leading from the source to the aerator, a down-take pipe from the aerator to the lower pressure tank arranged to supply air-charged water to the pressure tank, and an uptake pipe to lead water from the lower pressure tank up to the discharge conduit.

In testimony whereof I have signed my name to this specification in the presence of two subscribing witnesses.

ALBERT EDWARD HODDER.

Witnesses:
   HERBERT BURRAGE,
   CHARLES JOHNSON FLATHER.